United States Patent [19]

Jost et al.

[11] 4,082,778
[45] Apr. 4, 1978

[54] ARYLAMINOANTHRAQUINONES

[75] Inventors: Max Jost, Oberwil; Arnold Wick, Therwil, both of Switzerland

[73] Assignee: Ciba-Geigy Corporation, Ardsley, N.Y.

[21] Appl. No.: 704,609

[22] Filed: Jul. 12, 1976

[30] Foreign Application Priority Data

Jul. 23, 1975 Switzerland .................. 9622/75

[51] Int. Cl.$^2$ .................. C09B 1/16; C09B 1/50
[52] U.S. Cl. .................. 260/378; 260/380; 260/381; 8/39 B; 8/39 C; 8/40
[58] Field of Search .................. 260/378, 380, 381

[56] References Cited

U.S. PATENT DOCUMENTS

| 2,782,187 | 2/1957 | Sartori .................. 260/205 |
| 3,975,410 | 8/1976 | Wick et al. .................. 260/381 X |

FOREIGN PATENT DOCUMENTS

| 2,418,379 | 4/1974 | Germany. |
| 2,447,708 | 4/1975 | Germany. |
| 352 of | 1906 | United Kingdom .................. 260/381 |
| 990,290 | 4/1965 | United Kingdom .................. 260/380 |
| 173,863 | 11/1965 | U.S.S.R. .................. 260/378 |

OTHER PUBLICATIONS

Braun "2-Aralkylquinizarins" in Chem. Ab. 12665d, vol. 70, 1969 p. 66.
Watanabe et al., "Coloring of Thermoplastic Resins" in Chem. Abs. 67353s vol. 79, 1973, p. 43.
Rowe et al., "Preparation of Phthalazine . . . From 2-Chloro-4-Nitroaniline" in Chem. Abs. 1932, p. 1923.

*Primary Examiner*—Paul F. Shaver

*Attorney, Agent, or Firm*—Vincent J. Cavalieri

[57] ABSTRACT

An arylaminoanthraquinone of the formula

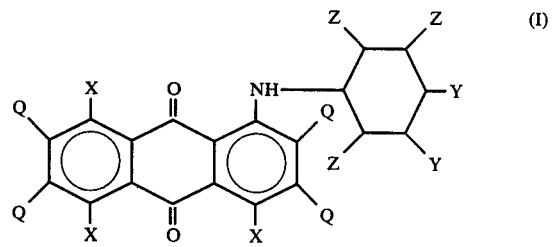

in which one X, in the 5- or 8-position, denote either the radical of the formula

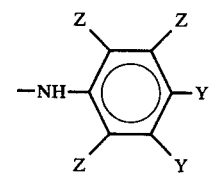

or a hydrogen atom, the other X denote hydrogen atoms, alkoxy groups with 1-4 C atoms, aryloxy, arylmercapto or acylamino groups, one Y denotes a nitro group and the other denotes a hydrogen atom, one or two Z which are not adjacent to the nitro group denote chlorine atoms and the remaining Z denote hydrogen atoms, and the Q denote hydrogen or halogen atoms which is useful for coloring high-molecular material.

4 Claims, No Drawings

ARYLAMINOANTHRAQUINONES

The invention relates to arylaminoanthraquinones of the formula

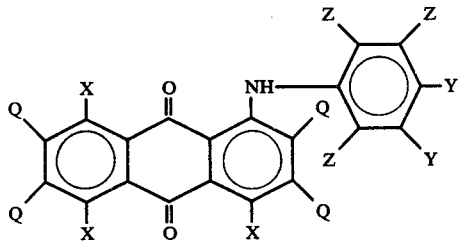

in which one X, in the 5- or 8-position, denote either the radical of the formula

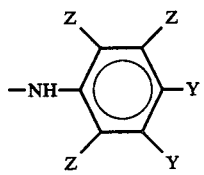

or a hydrogen atom, the other X denote hydrogen atoms, alkoxy groups with 1-4 C atoms, aryloxy, arylmercapto or acylamino groups, one Y denotes a nitro group and the other denotes a hydrogen atom, one or two Z which are not adjacent to the nitro group denote chlorine atoms and the remaining Z denote hydrogen atoms, and the Q denote hydrogen or halogen atoms.

Compounds of particular interest are those of the formula

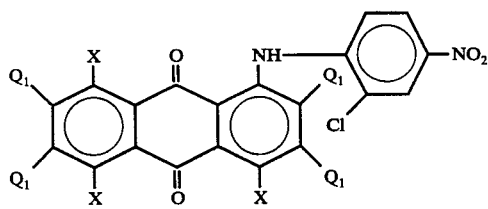

in which one or two $Q_1$ denote hydrogen or halogen atoms, the remaining $Q_1$ denote hydrogen atoms, one X in the 5- or 8-position denotes the radical of the formula

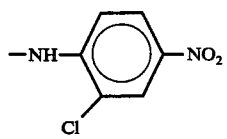

or a hydrogen atom and the other X denote hydrogen atoms, alkoxy groups with 1-4 C atoms or aryloxy, arylmercapto or acylamino groups.

The colorants according to the invention can be obtained by reacting an aminoanthraquinone of the formula

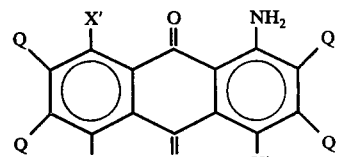

in which Q has the abovementioned meaning, one X' in the 5- or 8-position denotes an amino group or a hydrogen atom and the other X' denote hydrogen atoms or alkoxy, aryloxy, arylmercapto, arylamino or acylamino groups, with a bromonitrobenzene of the formula

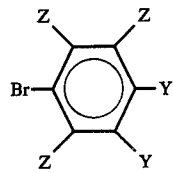

wherein Y and Z have the indicated meaning, in the presence of an acid-binding agent, for example an alkali metal carbonate or alkali metal acetate, and of a copper catalyst, especially a Cu-I halide, in a relatively high-boiling solvent, especially nitrobenzene, suitably at temperatures between 130° and 210° C.

Examples of aminoanthraquinones which may be mentioned are: 1-aminoanthraquinone, 1-amino-4-methoxyanthraquinone, 1-amino-5-methoxyanthraquinone, 1-amino-4-phenoxyanthraquinone, 1-amino-5-phenoxyanthraquinone, 1-amino-4-phenylmercaptoanthraquinone, 1-amino-5-phenylmercaptoanthraquinone, 1-amino-8-phenylmercaptoanthraquinone, 1-amino-4-benzoylaminoanthraquinone, 1-amino-5-benzoylaminoanthraquinone, 1-amino-8-benzoylaminoanthraquinone, 1,5-diaminoanthraquinone and 1,8-diaminoanthraquinone.

Preferably, however, the colorants according to the invention are obtained by reacting a halogenoanthraquinone of the formula

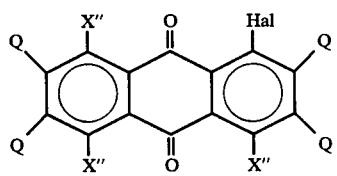

in which Q has the indicated meaning, one X'' in the 5- or 8-position denotes a halogen atom or a hydrogen atom and the other X'' denote hydrogen atoms, alkoxy groups with 1-4 C atoms or aryloxy, arylmercapto or acylamino groups, with a chloronitroaniline of the formula

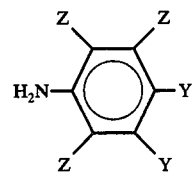

in which Y and Z have the indicated meaning, in the presence of an acid-binding agent, for example an alkali metal carbonate or alkali metal acetate, and of a copper catalyst, especially a copper iodide/pyridine base complex, in a high-boiling solvent, especially o-dichlorobenzene or nitrobenzene, suitably at temperatures between 130° and 210° C.

The following may be mentioned as examples of suitable halogenoanthraquinones: 1-chloroanthraquinone, 1-bromoanthraquinone, 1,3-dichloroanthraquinone, 1,3-dibromoanthraquinone, 1-chloro-4-acetylaminoanthraquinone, 1-chloro-5-acetylaminoanthraquinone, 1-chloro-4-benzoylaminoanthraquinone, 1-chloro-5-benzoylaminoanthraquinone, 1chloro-8-benzoylaminoanthraquinone, 1,5-dichloroanthraquinone and 1,8-dichloroanthraquinone.

The following may be mentioned as examples of suitable chloro-4-nitroanilines or chloro-5-nitroanilines: 2-chloro-4-nitroaniline, 2,6-dichloro-4-nitroaniline and 2-chloro-5-nitroaniline.

The arylaminoanthraquinones obtained can be used for colouring high-molecular organic compounds, for example cellulose, cellulose ethers and cellulose esters, such as ethylcellulose, nitrocellulose, cellulose acetate, cellulose butyrate, polyamides, polyurethanes or polyesters, natural resins or synthetic resins, such as polymerisation resins or condensation resins, for example aminoplasts, especially urea-formaldehyde resins and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures.

It is immaterial whether the high-molecular compounds mentioned are in the form of plastic masses or melts or in the form of spinning solutions, lacquers, paints or printing inks.

In the case of those of the colorants according to the invention which represent pigments, it is advisable to convert the latter into a finely divided form, for example by suitable mechanical treatment, for example grinding or kneading, in the presence of salts, before incorporating them into the high-molecular compounds. Instead of the pure pigments, pigment preparations can also be used.

Those of the colorants according to the invention which are soluble in organic media are preferentially suitable for the bulk-dyeing of spinnable polymers, for example of polyolefines, or especially of linear polyesters.

To achieve special effects such as, for example, improved solubility in thermoplastics, it can be advantageous to mix colorants according to the present invention with one another or with other suitable colorants or to obtain mixtures directly by suitable choice of different starting materials.

Linear polyesters which should be mentioned are especially those which are obtained by polycondensation of terephthalic acid or its esters with glycols of the formula HO—$(CH_2)_n$—OH, in which $n$ denotes the number 2-10, or with 1,4-di-(hydroxymethyl)-cyclohexane, or by polycondensation of glycol ethers of hydroxybenzoic acids, for example p-($\beta$-hydroxyethoxy)-benzoic acid. The term linear polyester also embraces copolyesters which are obtained by partial replacement of the terephthalic acid by another dicarboxylic acid or a hydroxycarboxylic acid and/or by partial replacement of the glycol by another diol.

However, the polyethylene terephthalates are of particular interest.

The linear polyesters to be coloured, advantageously in the form of powders, chips or granules, are intimately mixed with the colorant. This can be done, for example, by sprinkling the polyesterparticles with the finely divided dry colorant powder or by treating the polyester particles with a solution or dispersion of the colorant in an organic solvent and then removing the solvent.

Finally, the colorant can also be added directly to the fused polyester.

The ratio of colorant to polyester can vary within wide limits, depending on the desired color strength. In general, it is advisable to use 0.01-2 parts of colorant per 100 parts of polyester.

The polyester particles treated in this way are fused in an extruder in accordance with known processes and are extruded to form articles, especially sheets or fibres, or cast to form slabs.

Uniformly and intensely colored articles of high fastness to light are obtained. The colored fibres obtainable according to the process are furthermore distinguished by excellent fastness to wet cleaning and dry cleaning.

A particular advantage of the colorants to be used according to the invention is that they dissolve in the polyester melt and, surprisingly, withstand high temperatures, of up to 300° C, without decomposition, so that considerably clearer colorations are obtained than when using insoluble pigments.

Compared to the o-nitroanilinoanthraquinones known from the literature, the compounds according to the invention are distinguished by better heat resistance and, when applied in polyesters, inter alia by excellent stability as regards staining or non-colored polyester material during thermofixing.

In the examples which follow, the parts, unless noted otherwise, denote parts by weight and the percentages denote percentages by weight, and the temperatures are given in degrees centigrade.

EXAMPLE 1

24.25 parts of 1-chloroanthraquinone, 21.6 parts of 2-chloro-4-nitroaniline and 10 parts of sodium carbonate are suspended in 400 parts of o-dichlorobenzene. After adding a solution of 0.4 part of copper-(I) iodide in 5 parts of pyridine and 26 parts of toluene, the mixture is heated to 160°–165°. The water produced is distilled off azeotropically and the toluene is recirculated into the reaction vessel. After about 1½ hours, the orange-coloured reaction product precipitates in a crystalline form. After a reaction time of five hours, the mixture is allowed to cool. 1-(2'-Chloro-4'-nitroanilino)-anthraquinone is filtered off, washed with o-dichlorobenzene, acetone and hot water and extracted by boiling with dilute hydrochloric acid, and is thus obtained in the form of orange-brown crystals in a yield of 30.2 parts. The colorant obtained, when applied (Example 15) in polyesters, gives fast orange colorations. In contrast, 1-(2'-nitro-4'-chloroanilino)-anthraquinone (Annalen der Chemie 380; 334 (1911)) exhibits inadequate heat stability when applied in the polyester composition.

EXAMPLE 2

23.65 parts of 3-chloro-4-bromonitrobenzene, 22.3 parts of 1-aminoanthraquinone, 10 parts of sodium carbonate and 1 part of copper-(I) chloride in 200 parts of nitrobenzene are stirred for 17 hours at 170°. When the reaction mixture has cooled, it is filtered and the reaction product is washed with nitrobenzene, ethanol and hot water, extracted by boiling with dilute hydrochloric acid, dried and then recrystallized twice from nitrobenzene. 29.4 parts of 1-(2'-chloro-4'-nitroanilino)-anthraquinone, the properties of which agree with those of the material according to Example 1, are obtained.

EXAMPLE 3

43.2 parts of 2-chloro-4-nitroaniline, 20 parts of sodium carbonate and 27.7 parts of 1,5-dichloroanthraquinone are suspended in 720 parts of nitrobenzene, whilst stirring. The mixture is heated to 190°, a solution of 0.8 part of copper-(I) iodide in 4 parts of picoline (a mixture of the 3-and 4-isomers) is added, and the batch is kept for 4 hours at 190°–192° whilst at the same time passing a stream of nitrogen through it. After cooling to 110°, the resulting suspension is filtered and the crystalline precipitate is washed with nitrobenzene and then with ethanol and hot water. After extraction by boiling with dilute hydrochloric acid, 1,5-di-(2'-chloro-4'-nitroanilino)-anthraquinone is obtained in a yield of 51.4 parts, corresponding to 93% of theory, in the form of brown crystals.

EXAMPLE 4

The replacement of 1,5-dichloroanthraquinone in Example 3 by 1,8-dichloroanthraquinone gives 1,8-di-(2'-chloro-4'-nitroanilino)-anthraquinone in 90% yield. After conversion to a finely divided form, the pigment colors polyvinyl chloride and lacquers in brown shades.

EXAMPLE 5

36.15 parts of 1-chloro-4-benzoylaminoanthraquinone, 21.6 parts of 2-chloro-4-nitroaniline and 10 parts of sodium carbonate are stirred in 400 parts of o-dichlorobenzene. A solution of 0.4 part of copper-(I) iodide in 5 parts of pyridine, and 25 parts of toluene, are added and the mixture is heated to the boil — 160° to 165°. The water liberated is distilled off azeotropically and the toluene is recirculated. After a reaction time of 45 minutes, the reaction product begins to precipitate. The mixture is stirred for 7 hours at 160°–165° and is then allowed to cool. The precipitate is filtered off, washed with o-dichlorobenzene, acetone and hot water, and extracted by boiling with dilute hydrochloric acid. 34.4 parts of 1-(2'-chloro-4'-nitroanilino)-4-benzoylaminoanthraquinone are obtained in the form of a dark powder. The colorant bulk-dyes PES in claret-colored shades of good fastness properties.

Analysis
Calculated: C, 65.13; H, 3.24; Cl, 7.02; N, 8.44.
Found: C, 65.27; H, 3.32; Cl, 7.03; N, 8.60.

EXAMPLE 6

If, in Example 4, 1-chloro-4-benzoylaminoanthraquinone is replaced by 1-chloro-5-benzoylaminoanthraquinone, 38 parts of 1-(2'-dichloro-4'-nitroanilino)-5-benzoylaminoathraquinone are obtained; this material bulk-dyes PES in brown-orange shades of good fastness properties.
Analysis:
Calculated: C, 65.13; H, 3.24; Cl, 7.12; N, 8.44%.
Found: C, 65.00; H, 3.21; Cl, 7.14; N, 8.55%.

EXAMPLE 7

If, in Example 5, 2-chloro-4-nitroaniline is replaced by 2-chloro-5-nitroaniline, 1-(2'-chloro-5'-nitroaniline)-4-benzoylaminoanthraquinone is obtained; this bulk-dyes polyesters in a claret-colored shade.
Analysis: Calculated: C, 65.13; H, 3.24; Cl, 7.12; N, 8.44%. Found: C, 65.3; H, 3.4; Cl, 7.1; N, 8.9%.

EXAMPLE 8

27.7 parts of 1,3-dichloroanthraquinone, 18.15 parts of 2-chloro-4-nitroaniline and 10 parts of sodium carbonate are suspended in 400 parts of o-dichlorobenzene whilst stirring. After adding a solution of 0.4 part of copper-(I) iodide in 5 parts of pyridine and 25 parts of toluene, the mixture is kept at 160°–165° for 5 hours, whilst eliminating the water of reaction. When the mixture has cooled, it is filtered and the precipitate is washed with o-dichlorobenzene, acetone and hot water and extracted by boiling with dilute hydrochloric acid. 29 parts of 1-(2'-chloro-4'-nitroanilino)-3-chloroanthraquinone, which bulk-dyes PES in orange shades of good fastness properties, are obtained.
Analysis: Calculated: C, 58.14; H, 2.44; Cl, 17.16; N, 6.78%. Found: C, 58.03; H, 2.41; Cl, 16.86; N, 6.79%.

EXAMPLE 9

12.1 parts of 1-chloroanthraquinone and 5.3 parts of dust-fine sodium carbonate are freed from adhering moisture by brief stirring in 120 parts of nitrobenzene at the reflux temperature, whilst distilling a little solvent. Thereafter, 12.5 parts of 2,6-dichloro-4-nitroaniline and a solution of 0.8 part of copper-I iodide in 4 parts of α-picoline are added at 140° C and the reaction mixture is warmed to 180° C whilst stirring. At this temperature, the mixture is stirred for 6 hours whilst distilling off the water formed during the condensation. After the mixture has cooled, the crystalline reaction product is filtered off, washed with alcohol and then with hot water and dried in vacuo at 80°–90°. 18 parts of 1-(2',6'-dichloro-4'-nitroanilino)-anthraquinone, which bulk-dyes polyester in fast yellow shades, are obtained.

If, in the above example, instead of 1-chloroanthraquinone equivalent amounts of 1-chloro-4-benzoylaminoanthraquinone are used, 1-(2',6'-dichloro-4'-nitroanilino)-4-benzoylaminoanthraquinone is obtained, which colors PES red, whilst with 1-chloro-5-benzoylaminoanthraquinone, 1-(2',6'-dichloro-4'-nitroaniline)-5-benzoylaminoanthraquinone is produced, which colors PES orange.

EXAMPLE 10

29.9 parts of 1-chloro-4-acetylaminoanthraquinone, 21.6 parts of 2-chloro-4-nitroaniline and 10 parts of sodium carbonate are suspended in a mixture of 390 parts of o-dichlorobenzene and 26 parts of toluene, and after adding a solution of 0.4 part of copper-(I) iodide in 5 parts of pyridine, the mixture is heated to the boil whilst removing the water liberated. The reaction has ended after about 3 hours. The mixture is allowed to cool to 80° and the 1-(2'-chloro-4'-nitronilino)-4-acetylaminoanthraquinone formed is filtered off. After working up in the customary manner, the colorant, which bulk-dyes polyester in a claret-colored shade, is obtained.
Analysis: Calculated: C, 60.63; H, 3.24; Cl, 8.14; N, 9.64%. Found: C, 59.8; H, 3.4; Cl, 7.8; N, 9.6%.

If 2-chloro-4-nitroaniline is replaced by 2-chloro-5-nitroaniline, 1-(2'-chloro-5'-nitroanilino)-4-acetylaminoanthraquinone, which has similar properties to the above, is obtained.

EXAMPLE 11

12.65 parts of 1-amino-5-methoxyanthraquinone, 15.3 parts of 1-bromo-2-chloro-4-nitrobenzene, 5 parts of sodium carbonate and 1 part of copper-(I) chloride in 120 parts of nitrobenzene are stirred for 3 hours at 170°. To remove the water formed during the reaction, a stream of nitrogen is passed through the apparatus during the reaction. After cooling the reaction mixture to 25°, the 1-(2'-chloro-4'-nitroanilino)-5-methoxyanthraquinone formed is filtered off, washed with nitrobenzene, ethanol and hot water and extracted by boiling with 5% strength hydrochloric acid. The colorant is obtained in a yield of 19.5 parts, that is to say 95% of theory. It bulk-dyes polyester in an orange-coloured shade having excellent fastness properties.

Analysis: Calculated: C, 61.70; H, 3.21; N, 6.85%. Found: C, 61.4; H, 3.1; N, 6.8%.

If 1-amino-5-methoxyanthraquinone is replaced by 1-amino-5-phenoxyanthraquinone, 1-amino-4-phenylmercaptoanthraquinone or 1-amino-5-phenylmercaptoanthraquinone, the following are obtained analogously:

| | Shade of bulk-dyed polyester |
|---|---|
| 1-(2'-chloro-4'-nitroanilino)-5-phenoxyanthraquinone | orange |
| 1-(2'-chloro-4'-nitroanilino)-4-phenylmercaptoanthraquinone | red |
| 1-(2'-chloro-4'-nitroanilino)-5-phenylmercaptoanthraquinone | orange |

EXAMPLE 12

A preparation with a pigment content of 15% is produced by dispersing the 1,5-di-(2'-chloro-4'-nitroanilino)-anthraquinone, obtained according to Example 3, in water, in the presence of sodium dinaphthylmethanedisulphonate, using a glass bead mill, until the particle size is 1μ. 5.0 parts of this preparation are diluted with 20 parts of water and added to 834 parts of viscose, corresponding to 75 parts of cellulose. The mass is stirred until uniform distribution of the pigment is obtained. After spinning the pigmented viscose, a brown-colored material is produced, which has good fastness to light and excellent wet fastness properties (for example fastness to washing, soda boiling and hypochlorite).

EXAMPLE 13

65 parts of stabilished polyvinyl chloride, 35 parts of dioctyl phthalate and 0.2 part of the finely divided pigment obtained according to Example 3 are stirred together and then milled on a twin-roll calender for 7 minutes at 140°. A brown-colored sheet of good fastness to light and to migration is obtained.

EXAMPLE 14

10 g of titanium dioxide and 2 g of the finely divided 1,5-bis-(2'-chloro-4'-nitroanilino)-anthraquinone prepared according to Example 3 are ground with 88 g of a mixture of 26.4 g of coconut alkyd resin, 24.0 g of melamineformaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then stoved for 30 minutes at 120° C, a brown lacquering is obtained, which is distinguished by good color strength and good fastness to overlacquering and to light.

EXAMPLE 15

Example of use in a polyester

Granules of a non-delustered polyethylene terephthalate suitable for the manufacture of fibres are shaken with 1% of the colorant according to Example 1, in a container which can be closed, on a shaker for 15 minutes. The uniformly colored granules are spun on a melt spinning apparatus (285° ± 3°, residence time in the spinning machine: about 5 minutes) to give filaments which are drawn on a draw/twist apparatus, and are wound up. Because of the solubility of the colorant in polyethylene terephthalate, an orange coloration which is distinguished by outstanding fastness to light, excellent fastness to washing, dry cleaning, cross-dyeing, sublimation and rubbing after thermofixing, and high resistance to chlorite bleach, is obtained. Relative to a corresponding dyeing obtained with 1-(4'-nitroanilino)-anthraquinone or 1-(3'-nitroanilino)-anthraquinone, the dyeing described above exhibits substantially better behaviour in respect of staining of polyester and polyamide fabrics during thermofixing.

Testing the rub resistance after thermofixing (a) Thermofixing

A sample of the colored material is treated in a precision ironing press for 30 seconds at 210° and is additionally post-fixed for 30 minutes at 135° (SNV 195,833/1961; DIN 54,060/1962; ISO/R 105'IV, Part 2).

(b) Testing the rub resistance

In a Crockmeter, dry, non-colored cotton fabric or polyethylene terephthalate fabric is moved to and fro 10 times over the course of 10 seconds, under a pressure of 900 g, over a 10 cm long sample of the colored and thermofixed material. The staining of the non-colored material is assessed. (SNV 195,831; DIN 54,021/1958; ISO/R 105, Part 18).

Testing the staining during thermofixing

A sample of the colored material together with a non-colored comparison fabric (polyester), is treated in a precision ironing press for 30 seconds at 210° (SNV 195,833/1961; DIN 54,060/1962; ISO/R 105/IV Part 2).

EXAMPLE 16

1,000 parts of polyethylene terephthalate granules, 10 parts of titanium oxide (Kronos RN 40) and 1 part of finely divided 1-(2'-chloro-4'-nitroanilino)-anthraquinone according to Example 1 are mixed in a closed container for 2 hours on a roll stand. The colored granules are extruded at about 260° to give strands of 2 mm diameter and these are regranulated. The granules obtained are injection-moulded in an Anker screw injection moulding machine at 270°–280° to give mouldings. An orange-colored moulding of very good fastness to light is obtained.

What is claimed is:

1. An arylaminoanthraquinone of the formula

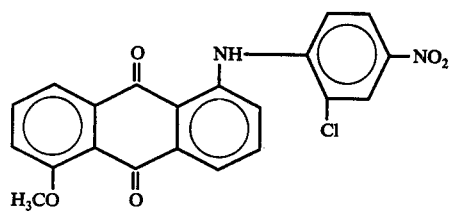
2. An arylaminoanthraquinone of the formula
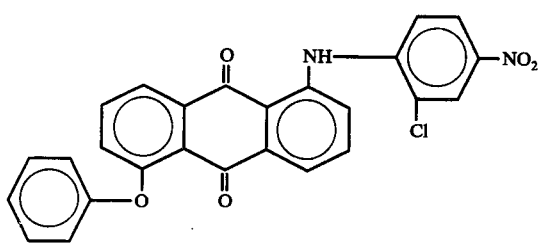
3. An arylaminoanthraquinone of the formula
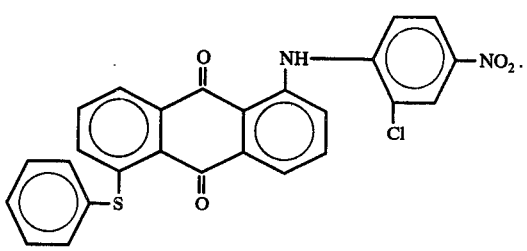
4. An arylaminoanthraquinone of the formula
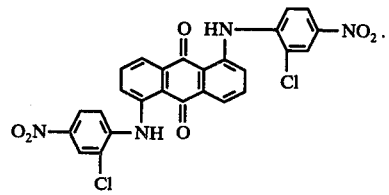
* * * * *